US010715445B2

(12) United States Patent
Owada et al.

(10) Patent No.: US 10,715,445 B2
(45) Date of Patent: Jul. 14, 2020

(54) COMMUNICATION DEVICE AND CONTROL METHOD FOR FRAME TRANSFER

(71) Applicant: JVC KENWOOD Corporation, Yokohama-shi, Kanagawa (JP)

(72) Inventors: Yasujiro Owada, Yokohama (JP); Kiyoharu Ohtani, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 51 days.

(21) Appl. No.: 15/919,521

(22) Filed: Mar. 13, 2018

(65) Prior Publication Data

US 2018/0205657 A1 Jul. 19, 2018

Related U.S. Application Data

(63) Continuation of application No. PCT/JP2016/075753, filed on Sep. 2, 2016.

(30) Foreign Application Priority Data

Sep. 14, 2015 (JP) .................................. 2015-180985

(51) Int. Cl.
*H04L 12/835* (2013.01)
*H04L 12/803* (2013.01)
(Continued)

(52) U.S. Cl.
CPC ............ *H04L 47/122* (2013.01); *H04L 47/30* (2013.01); *H04L 47/32* (2013.01); *H04L 2012/445* (2013.01)

(58) Field of Classification Search
None
See application file for complete search history.

(56) References Cited

U.S. PATENT DOCUMENTS 7,782,770 B1* 8/2010 Pannell .................. H04L 49/25
370/229
2006/0182036 A1* 8/2006 Sasagawa ................. H04L 1/24
370/242

(Continued)

FOREIGN PATENT DOCUMENTS

JP 2000295281 A 10/2000
JP 2004289744 A 10/2004
(Continued)

*Primary Examiner* — Kodzovi Acolatse
*Assistant Examiner* — The Hy Nguyen
(74) *Attorney, Agent, or Firm* — Brundidge & Stanger, P.C.

(57) ABSTRACT

In a communication device, a frame received via a port on the reception side is transmitted via a port on the transmission side. A first detector detects linkup of a port on the transmission side. When linkup is detected, a second detector detects a state closer to an overflow of a transmission buffer that accumulates a frame to be transmitted via the port on the transmission side. When a state closer to an overflow is detected, a control unit executes flow control via a port on the reception side when no transmission failure is detected in the port on the transmission side, and the control unit determines non-execution of flow control via the port on the reception side when a transmission failure is detected in the port on the transmission side.

3 Claims, 3 Drawing Sheets

(51) Int. Cl.
*H04L 12/823* (2013.01)
*H04L 12/44* (2006.01)

(56) References Cited

U.S. PATENT DOCUMENTS

2009/0323526 A1\* 12/2009 Pike ................ H04L 47/10
  370/235
2013/0268705 A1\* 10/2013 Maji ................ G06F 13/4291
  710/110

FOREIGN PATENT DOCUMENTS

JP   2008167482 A   7/2008
JP   2008205848 A   9/2008

\* cited by examiner

COMMUNICATION DEVICE AND CONTROL METHOD FOR FRAME TRANSFER

CROSS-REFERENCE TO RELATED APPLICATION

This application is based upon and claims the benefit of priority from the prior Japanese Patent Application No. 2015-180985, filed on Sep. 14, 2015, the entire contents of which are incorporated herein by reference.

BACKGROUND

1. Field

The present invention relates to a communication technique, and particularly to a communication device and a control method for frame transfer.

2. Description of the Related Art

A Layer 2 switch interconnects stations on a Local Area Network (LAN). When a bit error occurs or a buffer becomes full in the data link layer at Layer 2, the receiving device side merely discards an abnormal received frame. When a Layer 2 switch performs flow control, frame loss due to insufficient buffer resources can be avoided. The flow control is a control mechanism for preventing the transmitting device side from transmitting a data frame at a rate higher than the receivable data rate of the receiving device side. In the flow control, the receiving device side performs feedback control of transmission for the transmitting device side, and the transmission rate of the transmitting device side is adjusted depending on the state of a buffer of the receiving device side (see Patent Document 1, for example).

[Patent Document 1] Japanese Unexamined Patent Application Publication No. 2004-289744

A communication system may be configured by connecting multiple Layer 2 switches in a pyramid form, for example. In such a configuration, if a failure occurs in a cable connected to a port of a Layer 2 switch near the bottom level and if the Layer 2 switch executes flow control, communication may be stopped in the entire communication system.

SUMMARY

To solve the problem above, an aspect of the present embodiment relates to a communication device in which a frame received via a first interface is transmitted via a second interface, and the communication device includes: a first detector that detects linkup of the second interface; a second detector that detects, when the first detector detects linkup, a state closer to an overflow of a buffer that accumulates a frame to be transmitted via the second interface; and a control unit that executes flow control via the first interface when the second detector detects a state closer to an overflow and when no transmission failure is detected in the second interface. When the second detector detects a state closer to an overflow and when a transmission failure is detected in the second interface, the control unit determines non-execution of flow control via the first interface.

Another aspect of the present embodiment relates to a control method. The control method is for a communication device in which a frame received via a first interface is transmitted via a second interface, and the control method includes: detecting linkup of the second interface; detecting, when linkup is detected, a state closer to an overflow of a buffer that accumulates a frame to be transmitted via the second interface; executing flow control via the first interface when a state closer to an overflow is detected and when no transmission failure is detected in the second interface; and determining non-execution of flow control via the first interface when a state closer to an overflow is detected and when a transmission failure is detected in the second interface.

Optional combinations of the aforementioned constituting elements, and implementations of the present embodiment in the form of methods, apparatuses, systems, recording media, and computer programs may also be practiced as additional modes of the present embodiment.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

A general description will be given before the present invention is specifically described. An embodiment relates to a communication system configured by connecting multiple communication devices in a pyramid form. The communication devices may be Layer 2 switches or switching hubs, for example. For a buffer overflow in a communication device, flow control is effective, but may stop communication in the entire communication system, as described previously. In order to address the issue, when a state closer to a buffer overflow is detected, a communication device of the present embodiment will execute flow control if no cable failure is found, and will not execute flow control if a cable failure is found.

Figure 1:
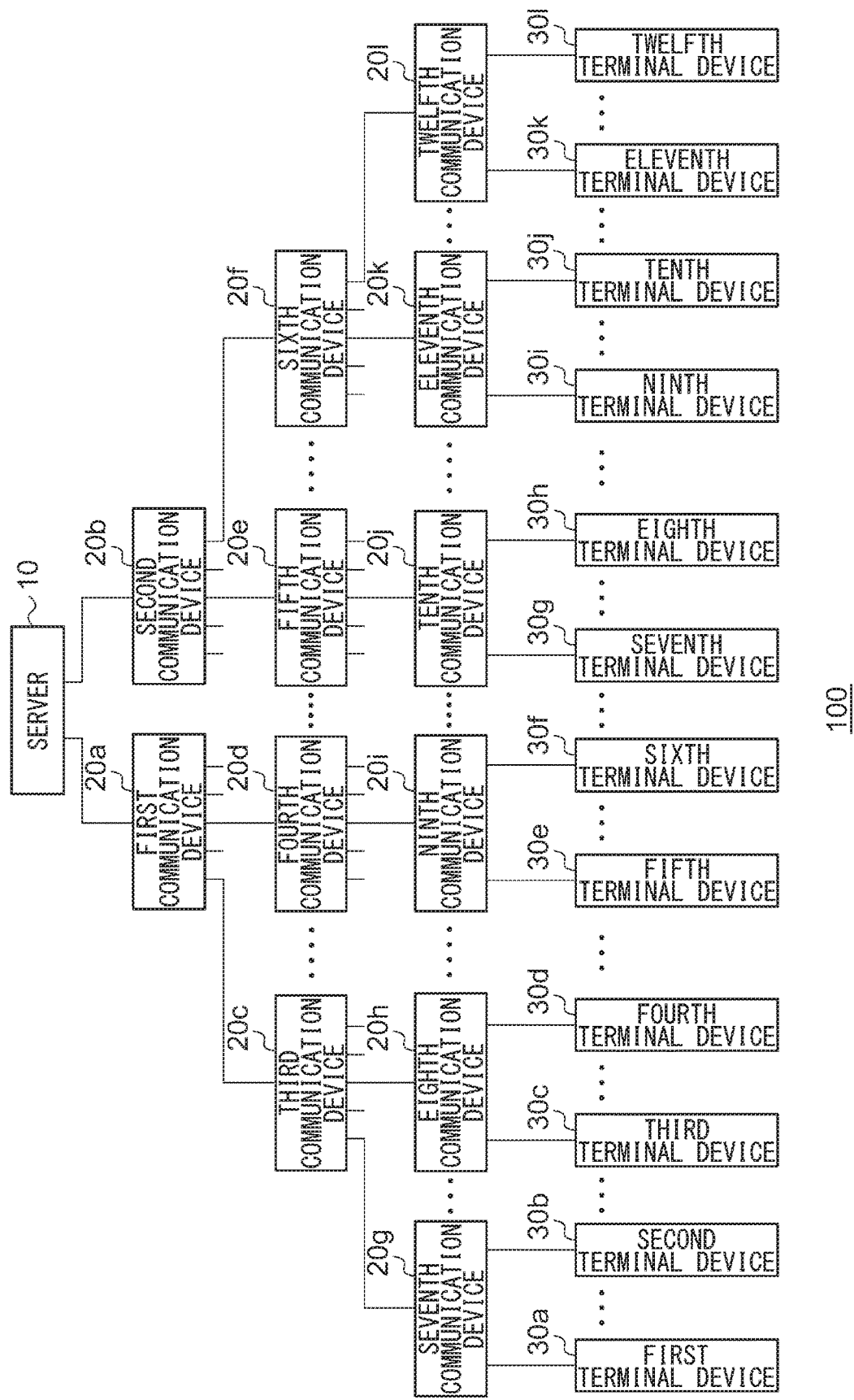
FIG. 1 is a diagram that shows a configuration of a communication system according to an embodiment.

FIG. 1 shows a configuration of a communication system 100 according to the embodiment. The communication system 100 comprises: a server 10; a first communication device 20a, a second communication device 20b, a third communication device 20c, a fourth communication device 20d, a fifth communication device 20e, a sixth communication device 20f, a seventh communication device 20g, an eighth communication device 20h, a ninth communication device 20i, a tenth communication device 20j, an eleventh communication device 20k, and a twelfth communication device 20l, which are collectively referred to as communication devices 20; and a first terminal device 30a, a second terminal device 30b, a third terminal device 30c, a fourth terminal device 30d, a fifth terminal device 30e, a sixth terminal device 30f, a seventh terminal device 30g, an eighth terminal device 30h, a ninth terminal device 30i, a tenth terminal device 30j, an eleventh terminal device 30k, and a twelfth terminal device 30l, which are collectively referred to as terminal devices 30.

The communication system 100 is configured by connecting multiple communication devices 20 in a pyramid form. At the top of the communication system 100 of a pyramid form, the server 10 is provided. To the server 10, the first communication device 20a and the second communication device 20b are connected. To the first communication device 20a and the second communication device 20b, the third communication device 20c through the sixth communication device 20f are connected, and, to the third communication device 20c through the sixth communication device 20f, the seventh communication device 20g through the twelfth communication device 20l are further connected. Accordingly, each of the seventh communication device 20g through the twelfth communication device 20l is connected to the server 10 via "two" communication devices 20, and each of the third communication device 20c through the sixth communication device 20f is connected to the server 10 via "one" communication device 20. Meanwhile, since the first communication device 20a and the second communication device 20b are directly connected to the server 10, it can be said that each of them is connected to the server 10 via "zero" communication device 20.

Communication devices 20 connected to the server 10 via the same number of communication devices 20 can be said to be communication devices 20 in the same level. A level of which a communication device 20 is connected to the server 10 via a smaller number of communication devices 20 is an "upper" level, and a level of which a communication device 20 is connected to the server 10 via a larger number of communication devices 20 is a "lower" level. In the case of FIG. 1, the first communication device 20a and the second communication device 20b are included in the upper level next to the level of the server 10, and the seventh communication device 20g through the twelfth communication device 20l are included in the lowest level. Further, to the seventh communication device 20g through the twelfth communication device 20l, multiple terminal devices 30 are connected. The number of levels of the communication devices 20 connected in a pyramid form is not limited to "3". Also, the number of communication devices 20 included in each level may be different from that shown in FIG. 1. Further, a terminal device 30 may be connected to a communication device 20 included in an upper level.

The server 10 transmits a frame containing data. The data may be arbitrary data, and the final destination of the frame is a terminal device 30. The transmission may be unicast transmission, multicast transmission, or broadcast transmission. The communication devices 20 may be Layer 2 switches or switching hubs, as described previously, and have a function to transfer a frame. Also, the communication devices 20 can perform flow control. The flow control is a process of managing a data rate so as to prevent the situation where, between two nodes, a high-rate transmission side causes a low-rate reception side to overrun, and an example thereof is backpressure. The backpressure is a method by which, when a buffer in a communication device 20 is about to overflow, a collision signal is intentionally transmitted to the transmission source so as to restrain the transmission source from transmitting frames. Each terminal device 30 is an electronic device operated by a user, for example, and receives a frame from the server 10 via communication devices 20. Each terminal device 30 performs processing according to the data included in the received frame.

With such a configuration of the communication system 100, it is assumed that the server 10 transmits a broadcast frame to the terminal devices 30 via the communication devices 20. For example, the server 10 transmits a broadcast frame to the first communication device 20a, which then transmits the broadcast frame thus received to the third communication device 20c. Thereafter, the third communication device 20c transmits the broadcast frame thus received to the seventh communication device 20g, which then transmits the broadcast frame thus received to the first terminal device 30a. If the performance of the first terminal device 30a deteriorates, the receivable data rate of the first terminal device 30a will be lower.

Accordingly, even though the seventh communication device 20g receives broadcast frames from the third communication device 20c at a high data rate, the seventh communication device 20g can transmit the broadcast frames to the first terminal device 30a only at a lower data rate. As a result, the transmission buffer of the seventh communication device 20g is going to overflow, so that the seventh communication device 20g executes backpressure for the third communication device 20c so as to lower the data rate of the third communication device 20c. Thereafter, when the performance of the first terminal device 30a is recovered, the seventh communication device 20g terminates the backpressure for the third communication device 20c. Therefore, the data rate is recovered.

Meanwhile, the transmission buffer of the seventh communication device 20g is going to overflow also when a failure, such as a short circuit, occurs in a cable between the seventh communication device 20g and the first terminal device 30a, so that the seventh communication device 20g executes backpressure for the third communication device 20c. However, unlike the aforementioned case of deterioration in performance of the first terminal device 30a, a cable failure will not be recovered. Accordingly, because of the backpressure, the transmission buffer of the third communication device 20c is also going to overflow, so that the third communication device 20c executes backpressure for the first communication device 20a. Thus, the overflow of the transmission buffer is propagated to upper levels, so that the server 10 becomes unable to transmit broadcast frames. As a result, communication will be entirely stopped in the communication system 100. In order to prevent such a situation, the communication devices 20 perform the following processing.

Figure 2:
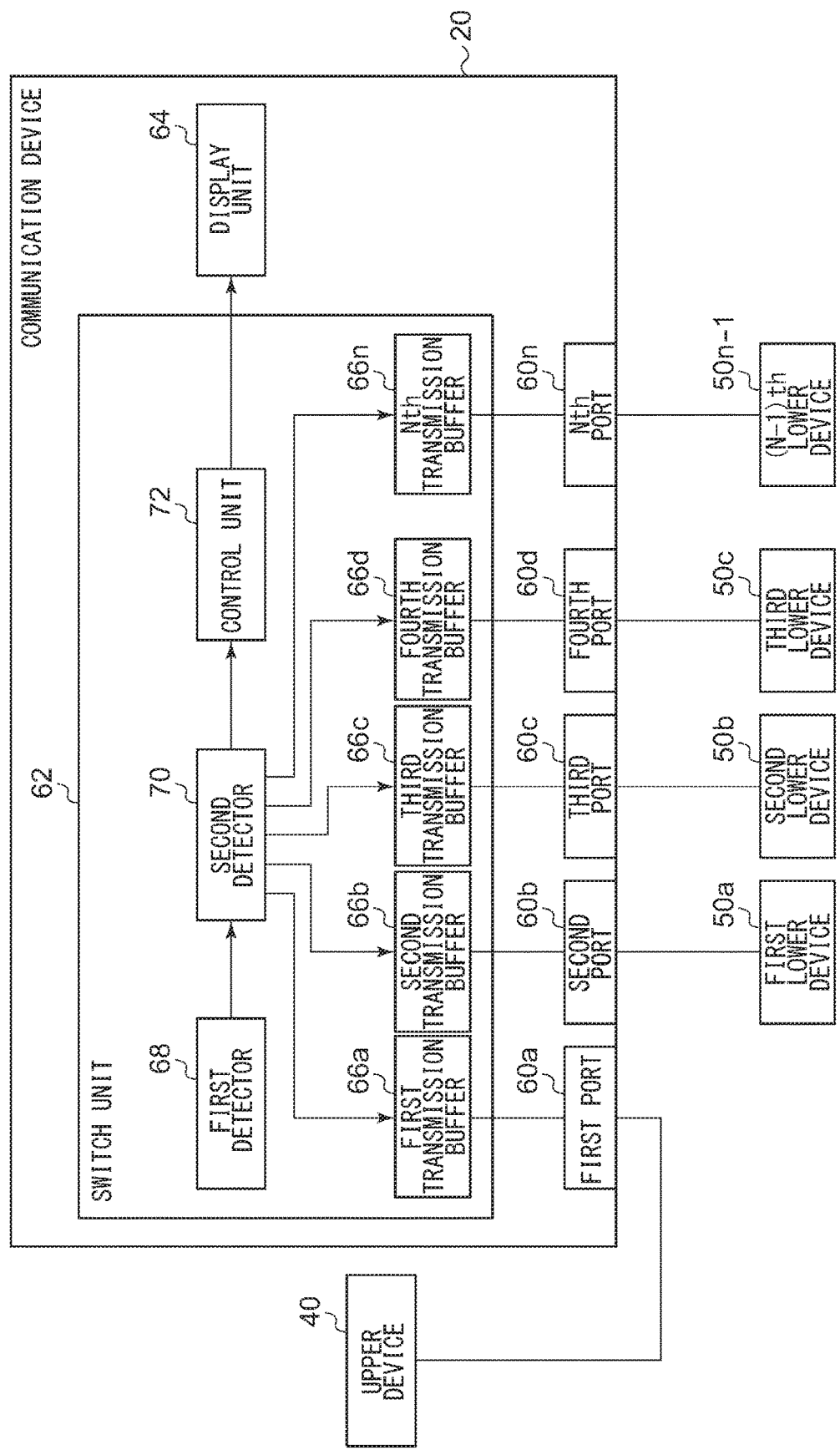
FIG. 2 is a diagram that shows a configuration of a communication device shown in FIG. 1.

FIG. 2 shows a configuration of a communication device 20. A communication device 20 is connected to an upper device 40, and a first lower device 50a, a second lower device 50b, a third lower device 50c, and an (N−1)th lower device 50n−1, which are collectively referred to as lower devices 50. The communication device 20 comprises a first port 60a, a second port 60b, a third port 60c, a fourth port 60d, and an Nth port 60n, which are collectively referred to as ports 60, a switch unit 62, and a display unit 64. The switch unit 62 includes a first transmission buffer 66a, a second transmission buffer 66b, a third transmission buffer 66c, a fourth transmission buffer 66d, and an Nth transmission buffer 66n, which are collectively referred to as transmission buffers 66, a first detector 68, a second detector 70, and a control unit 72.

The upper device 40 is another communication device 20 or the server 10 that is positioned in a level upper than the level of the communication device 20, and a lower device 50 is another communication device 20 or a terminal device 30 that is positioned in a level lower than the level of the communication device 20. Each port 60 is connectable with a LAN cable and is connected with the upper device 40 or a lower device 50 via the LAN cable. Therefore, it can be said that each port 60 is an interface for receiving or outputting a frame from or to the upper device 40 or a lower device 50 located externally. Each port 60 includes a transmission pin (TD pin) used to transmit a frame, and a reception pin (RD pin) used to receive a frame.

Based on the destination MAC address of a frame received via a port 60, the switch unit 62 determines another port 60 for the transmission destination and transfers the frame via the another port 60 thus determined. In the case of a broadcast frame, the switch unit 62 transfers the broadcast frame via the ports 60 other than the port 60 via which the broadcast frame is received. For example, when a broadcast frame is received via the first port 60a, the switch unit 62 transfers the broadcast frame via the second port 60b through the Nth port 60n. Also, when a broadcast frame is received via the fourth port 60d, the switch unit 62 transfers the broadcast frame via the first port 60a through the third port 60c and via the Nth port 60n. For the transfer, the frame to be transferred is once accumulated in a transmission buffer 66. Each transmission buffer 66 is provided in association with a corresponding port 60 one-on-one. For example, the first transmission buffer 66a is provided in association with the first port 60a. The same applies to the other transmission buffers 66.

The first detector 68 detects linkup of each port 60. This corresponds to detecting linkup of a port 60 used for frame transmission. The detection of linkup is determined by whether or not a link pulse signal is received at the RD pin, for example, and when a link pulse signal is received, linkup is detected. Upon detection of linkup of each port 60, the first detector 68 notifies the second detector 70 thereof.

Upon reception of notification from the first detector 68, the second detector 70 checks the available space in the transmission buffer 66 associated with the port 60 of which linkup has been detected. For example, when linkup of the second port 60b is detected, the second detector 70 checks the available space in the second transmission buffer 66b. When the available space is smaller than a first threshold value, the second detector 70 detects a state closer to an overflow of the transmission buffer 66. Upon detection of the state closer to an overflow of the transmission buffer 66, the second detector 70 notifies the control unit 72 thereof.

Upon reception of notification from the second detector 70, the control unit 72 checks whether or not a transmission failure is detected in the port 60 associated with the transmission buffer 66 of which the state closer to an overflow has been detected. In order to detect a transmission failure, the control unit 72 includes a transmission counter and a reception counter for each port 60. The transmission counter counts the number of frames transmitted from the port 60 for a predetermined period of time, such as 100 msec. Also, the reception counter counts the number of frames received at the port 60 for the same predetermined period of time. In the case of broadcast frames, when a communication device 20 receives a broadcast frame via a port 60, the communication device 20 transfers the broadcast frame via the other ports 60.

When the second port 60b is to be checked for a transmission failure, if no transmission failure has occurred, the sum of the reception counters for the ports 60 other than the second port 60b should be equal to the value of the transmission counter for the second port 60b. Based thereon, when the difference between the sum of the reception counters for the ports 60 other than the port 60 to be checked for a transmission failure (hereinafter, referred to as "ports 60 on the reception side") and the value of the transmission counter for the port 60 to be checked for a transmission failure (hereinafter, referred to as a "port 60 on the transmission side") is smaller than a second threshold value, the control unit 72 judges that no transmission failure is detected in the port 60 on the transmission side.

When the difference is the second threshold value or greater, on the other hand, or particularly when the sum of the reception counters is greater than the value of the transmission counter, the control unit 72 detects a transmission failure in the port 60 on the transmission side. This is because, if a short circuit or another cable failure occurs, a broadcast frame transmitted via the port 60 on the transmission side will be reflected in the failure part, so that the transmission will not be completed, and hence, the value of the transmission counter will not be increased. Even when the difference is the second threshold value or greater, the control unit 72 need not immediately detect a transmission failure. For example, the control unit 72 may detect a transmission failure when the difference is consecutively the second threshold value or greater a predetermined number of times. An example of the predetermined number of times is "4".

When the control unit 72 judges that no transmission failure is detected in the port 60 on the transmission side, the control unit 72 executes flow control, such as backpressure, via a port 60 on the reception side. Since a publicly-known technique may be used for the flow control, a specific description thereof is omitted here. When a transmission failure is detected in the port 60 on the transmission side, on the other hand, the control unit 72 does not execute flow control via a port 60 on the reception side. In this case, the control unit 72 discards a frame to be transmitted via the port 60 on the transmission side. When a cable failure occurs, the data rate is not recovered until the cable is replaced. Accordingly, even if the flow control is executed, frames for the flow control will be vainly transmitted from a port 60 on the reception side, and such frames will vainly use a band. Also, the upper device 40 for which the flow control is executed will wait to transmit frames and then retransmit the frames, which may cause a vain use of a band, an overflow in the upper device 40, and a stop of communication in the entire communication system 100. In order to prevent such situations, when a transmission failure is detected in the port 60 on the transmission side, i.e., when occurrence of a cable failure is presumed, the control unit 72 does not execute the flow control.

When the control unit 72 determines non-execution of the flow control via a port 60 on the reception side, the control unit 72 continues the non-execution of the flow control until the communication device 20 is restarted. Namely, the control unit 72 remains executing no flow control without detecting linkup of the port 60 on the transmission side, detecting a state closer to an overflow, or detecting a transmission failure. This is because, a cable failure is not recovered until the cable is replaced, as described previously. According to a notification from the second detector 70, the control unit 72 changes the port 60 on the transmission side and the ports 60 on the reception side to perform the aforementioned processing.

When the control unit 72 detects a transmission failure, the display unit 64 receives a notification from the control unit 72. The display unit 64 includes light emitting diodes (LEDs) corresponding to the respective multiple ports 60 and allows an LED corresponding to a port 60 specified in the notification to light up or flash. This corresponds to a notification of occurrence of a failure, such as a short circuit, in a cable connected to the port 60 indicated by the LED.

The configuration described above may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 3:
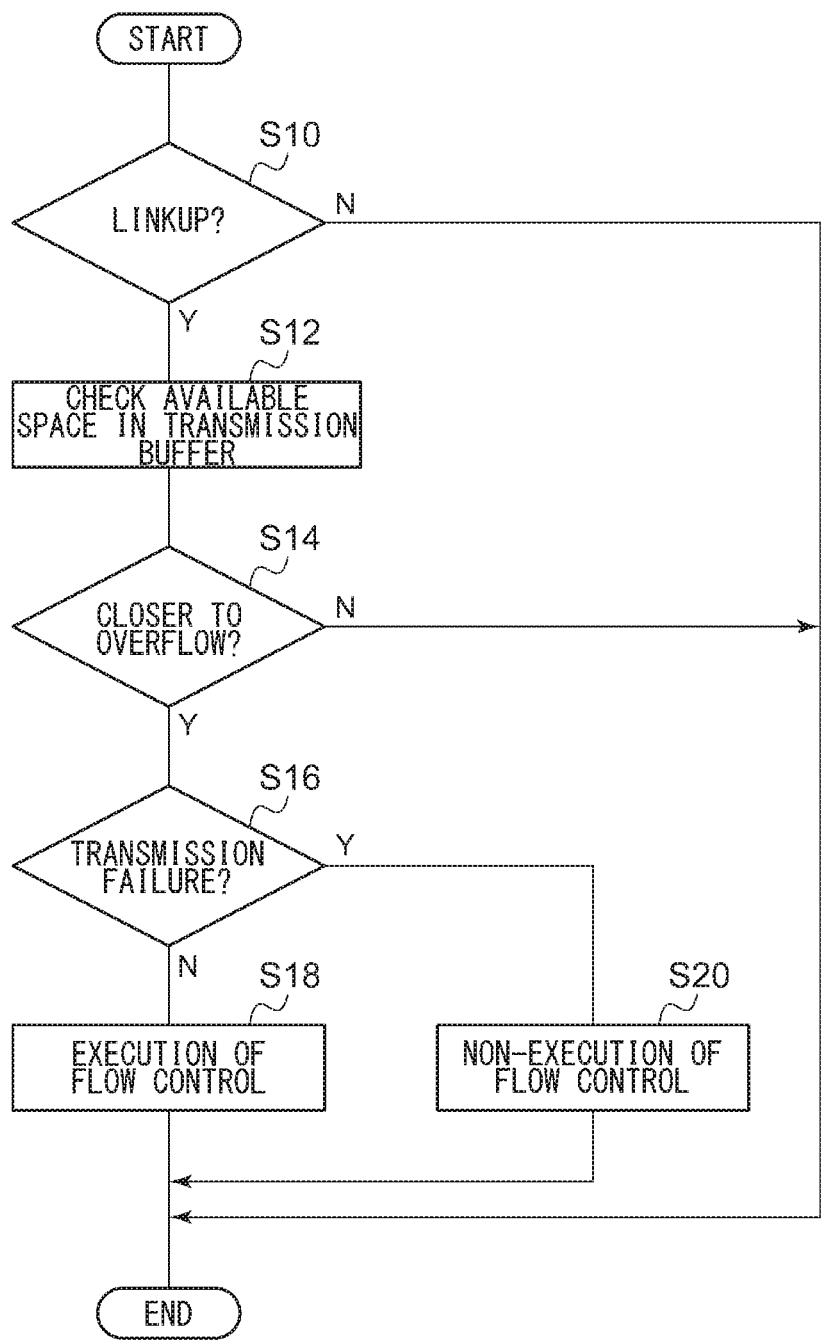
FIG. 3 is a flowchart that shows a procedure for executing flow control performed by the communication device shown in FIG. 2.

There will now be described an operation performed by the communication system 100 having the configuration set forth above. FIG. 3 is a flowchart that shows a procedure for executing flow control performed by a communication device 20. If the first detector 68 detects linkup of a port 60 (Y at S10), the second detector 70 will check the available space in the transmission buffer 66 associated with the port 60 (S12). If the state is closer to an overflow (Y at S14) and no transmission failure is detected (N at S16), the control unit 72 will execute flow control (S18). If a transmission failure is detected (Y at S16), the control unit 72 will not execute flow control (S20). If the first detector 68 does not detect linkup of any port 60 (N at S10), or if the state is not closer to an overflow (N at S14), the process will terminate.

In the present embodiment, even when a state closer to an overflow is detected, if a transmission failure is detected, flow control will not be executed, so that vain transmission of frames can be stopped. Also, since vain transmission of frames can be stopped, even if a cable failure occurs, a stop of communication in the entire communication system can be prevented. Also, when non-execution of flow control is determined, the non-execution of flow control is maintained, so that the processes for determining linkup, a state closer to an overflow, and a transmission failure can be made unnecessary. Since such processes become unnecessary, the processing amount can be reduced. Also, since occurrence of a cable failure is indicated by an LED, the replacement of the cable can be prompted. Also, since flow control is not executed, an upper device can be prevented from waiting to perform retransmission. Since an upper device can be prevented from waiting to perform retransmission, an overflow in the upper device can be prevented.

The present invention has been described with reference to the embodiment. The embodiment is intended to be illustrative only, and it will be obvious to those skilled in the art that various modifications to a combination of constituting elements or processes could be developed and that such modifications also fall within the scope of the present invention.

What is claimed is:

1. A communication device in which a frame received via a first interface is transmitted via a second interface, the communication device comprising:
  a memory storing a program that, in response to execution, causes a Central Processing Unit (CPU) to implement a configuration including:
  a first detector that detects linkup of the second interface;
  a second detector that detects, in response to the first detector detecting the linkup, a state closer to an overflow of a buffer that accumulates a frame to be transmitted via the second interface; and
  a control unit that executes flow control via the first interface in response to the second detector detecting the state closer to the overflow and in response to a difference between a value of a reception counter in the first interface and a value of a transmission counter in the second interface being smaller than a threshold and, accordingly no transmission failure is detected in the second interface,
  wherein, in response to the second detector detecting the state closer to the overflow and in response to the difference between the value of the reception counter in the first interface and the value of the transmission counter in the second interface being greater than or equal to the threshold or the difference being consecutively a threshold value or greater and, accordingly, a transmission failure being detected in the second interface, the control unit determines non-execution of flow control via the first interface, and
  wherein the reception counter and the transmission counter count a number of frames received or transmitted for a same period of time.

2. The communication device of claim 1, wherein, in response to the control unit determining non-execution of flow control via the first interface, the control unit continues the non-execution of the flow control until the communication device is restarted.

3. A control method for a communication device in which a frame received via a first interface is transmitted via a second interface, the control method comprising:
  detecting linkup of the second interface;
  detecting, in response to the linkup being detected, a state closer to an overflow of a buffer that accumulates a frame to be transmitted via the second interface;
  executing flow control via the first interface in response to the state closer to the overflow being detected and in response to a difference between a value of a reception counter in the first interface and a value of a transmission counter in the second interface being smaller than a threshold and, accordingly, no transmission failure is detected in the second interface; and
  determining non-execution of flow control via the first interface in response to the state closer to the overflow being detected and in response to the difference between the value of the reception counter in the first interface and the value of the transmission counter in the second interface is greater than or equal to the threshold or the difference being consecutively a threshold value or greater and, accordingly, a transmission failure being detected in the second interface,
  wherein the reception counter and the transmission counter count a number of frames received or transmitted for a same period of time.

* * * * *